United States Patent [19]
Schera, Jr.

[11] 3,898,471
[45] Aug. 5, 1975

[54] ELECTRIC GENERATOR RESPONSIVE TO WAVES IN BODIES OF WATER

[76] Inventor: Enos L. Schera, Jr., 8254 S.W. 37th St., Miami, Fla. 33155

[22] Filed: Aug. 15, 1974

[21] Appl. No.: 497,653

[52] U.S. Cl. .................................... 290/42; 290/53
[51] Int. Cl.² ......................................... F03B 13/12
[58] Field of Search .................. 290/42, 43, 53, 54; 417/330–334

[56] References Cited
UNITED STATES PATENTS

| | | | |
|---|---|---|---|
| 978,685 | 3/1911 | Atkinson | 290/42 |
| 3,746,875 | 7/1973 | Donatelli | 290/53 |

Primary Examiner—G. R. Simmons
Attorney, Agent, or Firm—Oltman and Flynn

[57] ABSTRACT

A float operated electric generator responsive to surface waves in a body of water independent of predetermined variations in the level of the water.

9 Claims, 9 Drawing Figures

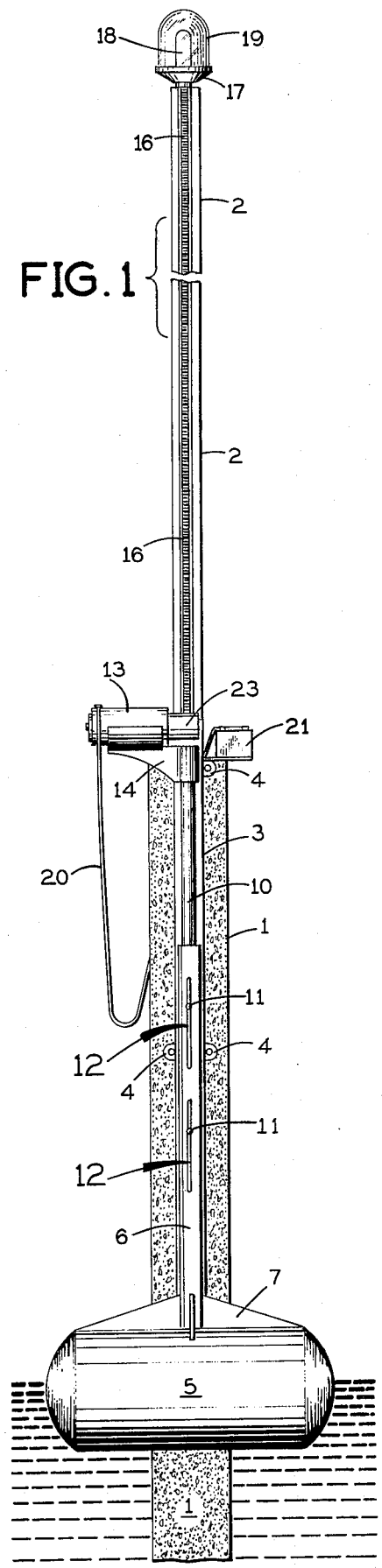
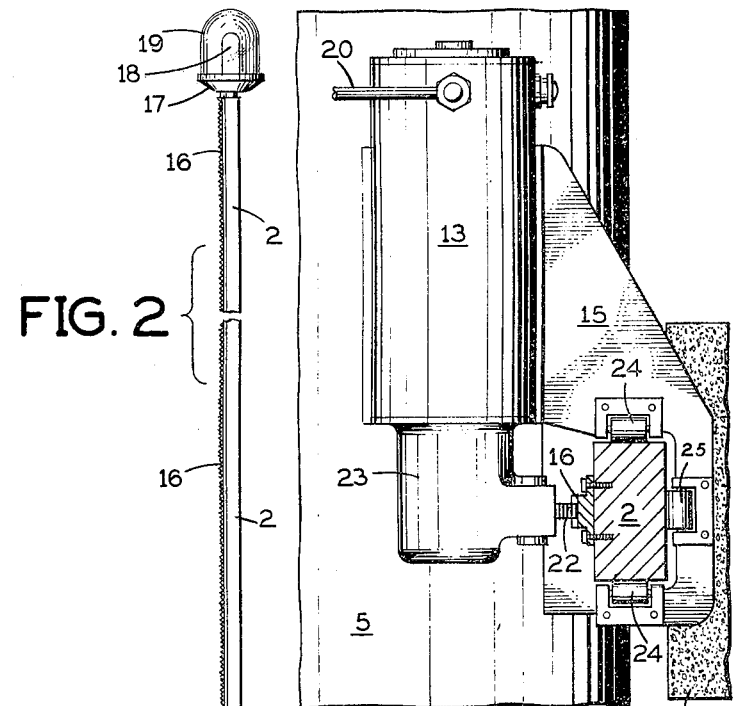
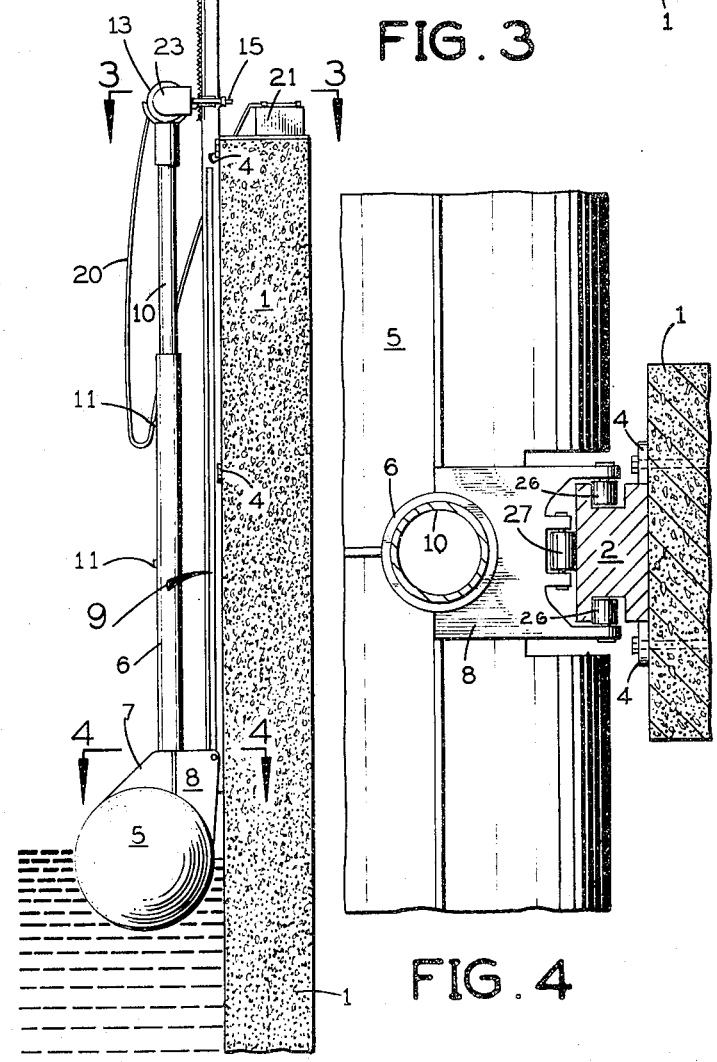
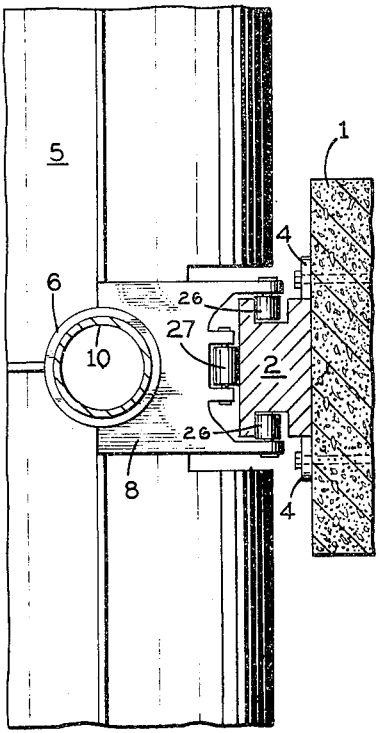
FIG. 1
FIG. 2
FIG. 3
FIG. 4

PATENTED AUG 5 1975
3,898,471
SHEET 2
FIG. 5
FIG. 6
FIG. 7
FIG. 8
FIG. 9
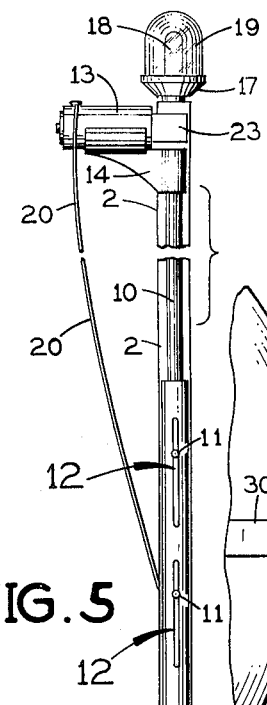
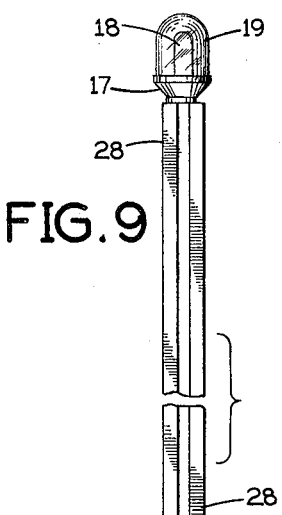
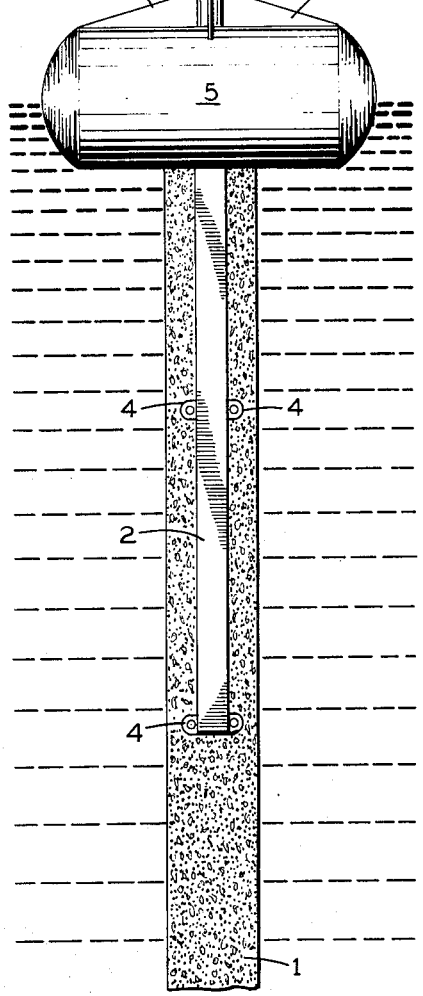
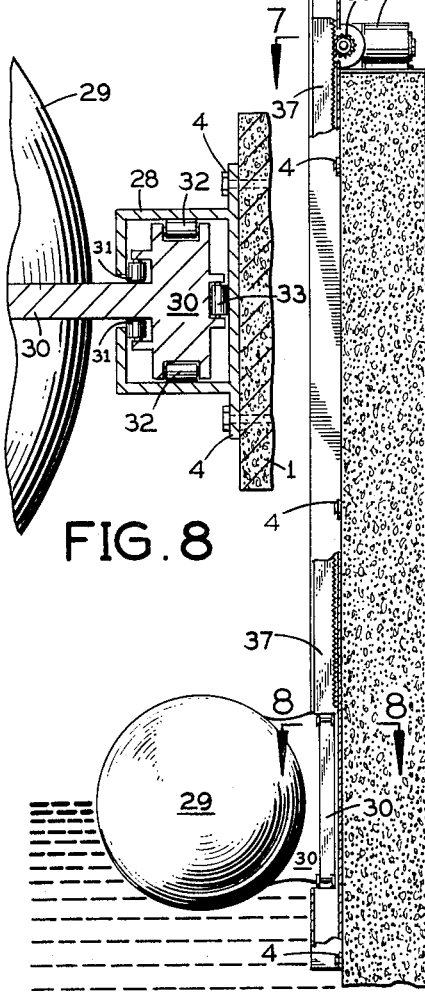
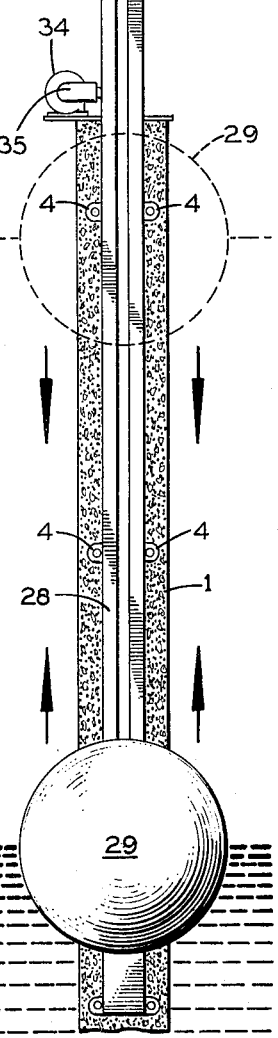

ELECTRIC GENERATOR RESPONSIVE TO WAVES IN BODIES OF WATER

This invention relates in general to power generating devices and more particularly to a generator responsive to surface waves, particularly in large bodies of water.

A principal object of the invention solves the problem of producing electric energy for various purposes, particularly flashing signals as an aid to navigation.

Another object of the invention is the provision of a long life flashing electric light device which requires a minimum of service, particularly useful in areas where power generation is not readily available.

A further object of the invention is the use of an alternating current generator with connections to a rectifier for charging storage batteries.

A further object of the invention is the provision of an electric generator for surface wave motion which will operate independent of ocean tides.

In addition to the concrete base shown, it is apparent that the relatively compact apparatus may be attached to a dock or other buildings associated with a body of water or on the side of a hull of a boat.

These and other objects and advantages in two embodiments of the invention are described and shown in the following specification and drawings, in which:

FIG. 1 is a front elevation of the wave generator in greatly reduced scale.

FIG. 2 is a side elevation of the generator shown in FIG. 1.

FIG. 3 is an enlarged cross sectional top plan view, taken through section line 3—3, FIG. 2.

FIG. 4 is a top plan view taken through section line 4—4, FIG. 2.

FIG. 5 is the same as FIG. 1 with the moving elements in a raised changed position.

FIG. 6 is a side elevation of an alternate form of construction.

FIG. 7 is an enlarged fragmentary top plan view taken through section line 7—7, FIG. 6.

FIG. 8 is an enlarged fragmentary cross sectional view taken through section line 6—6, FIG. 6.

FIG. 9 is a front elevation of the device shown in FIG. 6 illustrating the total range of movement for tidal height for oscillation of the float.

Referring to FIGS. 1 and 2, the entire apparatus is shown mounted against a concrete base 1, although it may be secured by proper fittings to an anchored buoy, a dock, or to the side of a boat for the generation of electricity.

The device utilizes a vertical rail 2 which has a portion 3 secured to the base 1 by integral ears 4—4.

A generally cylindrical hermetically sealed float 5 is secured to the lower end of a vertical outer tube 6 by a bracket means 7, which is guided by a float bracket extension 8 to engage a laterally journalled roller in each side of a slot 9 in the portion 3 of rail 2. A vertical inner tube 10 is slidably positioned within tube 6 and adjusted for projection therefrom for tide variations by a pair of screws 11—11 which are slidably positioned in slots 12—12 in the tube 6.

A hermetically sealed electric generator 13 is secured by bracket 14 to the upper end of tube 10, which bracket includes a guide member 15 for reciprocation along the upper end portion of rail 2. The rail 2 has centrally positioned on the upper end thereof a metal rack 16 terminating in this example in a base 17 for retaining an incandescent lamp 18 and a transparent cover 19 therefor.

A two-conductor waterproof cable 20 is connected to a voltage regular 21 from which a pair of conductors are run upward along the rail 2, not shown, and connected to lamp 18 for energizing same. The generator 13 is driven by a pinion 22 retained in mesh with rack 16 by transverse rollers 24—24 and a rear transverse roller 25.

Referring to FIG. 3, the generator 13 has a hermetically sealed housing 23 which retains a well known right angle gear train terminating in a pinion 22 which is permanently engaged with rack 16. The guide member 15, shown in FIG. 1, contains a pair of opposite rollers 24—24 pivoted for rotation in said bracket and a third outer roller 25 with all rollers journalled for rotation on three sides of the rail 2, which will retain the pinion in proper engagement with the rack.

FIG. 4 shows bracket extension 8 in detail, containing a pair of opposite rollers 26—26 pivoted for rotation on the outer sides of vertical rail 2 and an additional roller 27 on the outer side of rail 2.

Referring to FIGS. 6 and 7, a rectangular vertical slotted member 28 provides the vertical guidance member which is secured to base 1 by ears 4—4, and a hermetically sealed spherical float 29 secured to bracket member 30 provided with an elongated member for vertical movement within vertical slotted rail member 28 which member is guided by forward rollers 31 and side rollers 32 and a rear roller 33.

Referring to FIG. 7, a generator 34 is secured to the top of base 1 and provided with a hermetical sealed housing 35 which contains a well known right angle gear drive for rotating a pinion 36. A rack 37 is slidably secured for reciprocation within slotted member 28 by the rise and fall of the float 29.

The generator is wired through a waterproof conductor, not shown, and connected to an electric lamp mounted within cover 19 secured in base 17, which base is secured to the upper end of slotted member 28.

Referring again to FIG. 7, a rack 37 contains a forward roller 38 and a pair of side rollers 39—39 which guide the rack 37 for vertical reciprocation within slotted member 28.

In operation, this device is adapted to respond to normal surface waves on a base of water and is not intended to function with the action of ocean tides or other surface levels of bodies of water. Thus, the adjustment of the float with respect to the level of the water where waves normally occur is made by slots 12—12 and screws 11—11, however, when the float 5 responds to surface waves, the generator will be operated in opposite direction, which if a permanent magnet alternator is used, will generate a voltage when the float is moved upward and when moved downward. The voltage is regulated by the well known solid state regulator 21. From there the electric current is carried to lamp 18 for safety illumination. It has been found that even small oscillation will generate enough electric power to illuminate the lamp 18 to be visible within a reasonable range.

A modified version of the device is shown in FIGS. 6 and 9, in which the generator is stationary and presumably of larger size and weight than that shown in FIGS. 1 and 2 and thus the float is not hampered by raising the weight of the generator since the only load is the raising and lowering of the rack 37 for rotating the fixed generator.

It is also apparent that a hermetically sealed direct current generator will operate as a warning signal by the use of a solid state form of direct current regulation and the same incandescent lamp.

Many other uses of the apparatus described, such as the use of a solid state rectifier for charging storage batteries, or to operate audible signals or communication systems, is also within the scope of the device.

Having described my invention, I claim:

1. A float operated electric generator responsive to surface waves of a body of water comprising a fixed base means having a vertical portion thereof extending a predetermined distance into the said body of water,
    a substantially rectangular metal rail of predetermined length secured in vertical position on said vertical portion of said base means,
    a metal rack of predetermined pitch secured along the front side of said rail between the lowest level of said body of water and terminating at the top of said rail,
    said rail having a straight groove on opposite sides thereof extending from a predetermined small distance from the lower end thereof and extending upward a predetermined distance substantially equal to the distance between the low and high water level,
    a hermetically sealed float means of predetermined size having a bracket extending outward therefrom and retaining a roller engaged in each opposite said groove with said bracket having a third roller engaged against the outer side of said rail,
    a linear vertical extension of said float positioned in spaced parallel relation to said rail terminating in a second bracket means for supporting an electric generator and including an extension thereof retaining a like roller journalled transversely on opposite sides of said rail and said third roller journalled transversely on the rear of said extension provided to retain the vertical movement of the generator in a linear path, the said generator provided with gear means engaged with said rack for rotation by the vertical oscillation of said generator when oscillated by said float within the length of said rack for generating electricity by said generator when said float is vertically oscillated by water waves.

2. The construction recited in claim 1 wherein an electric lamp receptacle is secured to the upper end of said rail and retains a glass enclosed electric lamp which is connected by a waterproof cable to said generator whereby said lamp will flash intermittently when said float is reciprocated by water waves.

3. The construction recited in claim 1 wherein the generator is an alternating current permanent magnet type which is connected to a solid state rectifier by a waterproof cable for providing direct current for charging a storage battery.

4. The construction recited in claim 1 wherein the generator is of the alternating current type and connected by waterproof cable to a voltage regulator for supplying an electric power output of substantially constant voltage.

5. The construction recited in claim 1 whereby the said vertical extension of said float consists of a vertical tubular member secured to said float and a telescopic shaft within said tube secured to said second bracket means with screw means extending through vertical slots in said tubular member for adjusting the float with respect to the generator to accommodate variations in the level of said water.

6. The construction recited in claim 1 wherein said hermetically sealed float is generally cylindrical in shape.

7. A float operated electric generator responsive to surface waves in a body of water comprising a hollow rectangular rail secured to the vertical side of a base means,
    said rail extending a predetermined distance above said base and having a central slot of predetermined width through the outer side thereof,
    a rack member of predetermined length and pitch slidably positioned within said rail with the teeth of the rack member facing the said base,
    a spherical float having a vertical central extension slidably positioned through said slot in said rail and formed to journal a pair of opposite transverse rollers in contact with the opposite inner sides of said rail and one transverse roller journalled to contact the inner rear surface of said rail and a pair of transverse rollers journalled to rotate against the inner side of said rail on opposite sides of said bracket,
    an electric generator secured on the upper end of said base,
    said generator including a gear transmission terminating in a drive gear engaged with said rack through an opening in the rear side of said rail,
    a second guide means for said rack member in spaced relation to said first guide means comprising a pair of opposite transverse rollers journalled against opposite inner sides of said rack member,
    a third transverse roller journalled on said rack member and positioned against the inner mating sides of said slot whereby the oscillation of said float will rotate said generator and produce an electric current for a variety of electric loads and whereby said float will oscillate in response to waves of water independent of predetermined variations in the level of the water.

8. The construction recited in claim 1 wherein said hermetically sealed float is of generally cylindrical shape.

9. The construction recited in claim 1 wherein said hermetically sealed float is of spherical shape.

* * * * *